United States Patent
Nishikawa

(10) Patent No.: US 8,345,456 B2
(45) Date of Patent: Jan. 1, 2013

(54) CONTROL SYSTEM OF A POWER FACTOR CORRECTION CIRCUIT

(75) Inventor: Yukihiro Nishikawa, Hino (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 459 days.

(21) Appl. No.: 12/591,056

(22) Filed: Nov. 5, 2009

(65) Prior Publication Data

US 2010/0110739 A1    May 6, 2010

(30) Foreign Application Priority Data

Nov. 6, 2008 (JP) .......................... PA 2008-284922

(51) Int. Cl.
 *H02M 7/217* (2006.01)
(52) U.S. Cl. ............................. 363/89; 323/207; 363/44
(58) Field of Classification Search .................... 363/89, 363/44, 45–48, 79; 323/207, 222
See application file for complete search history.

(56) References Cited

U.S. PATENT DOCUMENTS

| | | | |
|---|---|---|---|
| 4,861,174 A | 8/1989 | Aratsu | |
| 5,146,398 A * | 9/1992 | Vila-Masot et al. | 363/89 |
| 5,615,098 A | 3/1997 | Ishii et al. | |
| 5,638,265 A * | 6/1997 | Gabor | 363/89 |
| 6,373,735 B2 * | 4/2002 | Usui | 363/89 |
| 2007/0058402 A1 * | 3/2007 | Shekhawat et al. | 363/89 |

FOREIGN PATENT DOCUMENTS

| | | |
|---|---|---|
| JP | 5-9187 | 3/1993 |
| JP | 8-32182 | 3/1996 |
| JP | 08-168248 A | 6/1996 |
| JP | 2001-028877 A | 1/2001 |

* cited by examiner

*Primary Examiner* — Harry Behm
(74) *Attorney, Agent, or Firm* — Rabin & Berdo, P.C.

(57) ABSTRACT

A control system for a power factor correction circuit performs stabilized oscillation operation and suppresses switching frequency variation due to change of the AC power source. A control system includes a voltage error amplifier for outputting a voltage error signal obtained by amplifying a difference between a DC output voltage Vo and a command value Vref of the DC output voltage, a current command value generating circuit for outputting a current command value Vi for controlling the input current Iin, a comparator comparing an inductor current signal obtained by detecting an inductor current running in the switching element by a current detecting resistor with a magnitude of the output signal Vi from the multiplier, a timer circuit for setting an off-period of the switching element corresponding to the voltage Vd, and a reset-set type flip-flop circuit for setting an off-timing of the switching element after an elapse of the off-period.

8 Claims, 5 Drawing Sheets

CONTROL SYSTEM OF A POWER FACTOR CORRECTION CIRCUIT

CROSS-REFERENCE TO RELATED APPLICATION

This application is based on, and claims priority to, Japanese Patent Application No. 2008-284922, filed on Nov. 6, 2008, the entirety of which is incorporated herein by reference.

BACKGROUND OF THE INVENTION

1. Field of the Invention

The present invention relates to a switching regulator for obtaining a stabilized DC output from an AC power source, in particular, to a control system of a power factor correction circuit for suppressing higher harmonic current flowing out to the AC power source side.

2. Description of the Related Art

In order to suppress higher harmonic current flowing out to the AC power source side, power factor correction circuits using a boosting chopper are widely applied to switching regulators, the boosting chopper comprising a rectifier bridge, an inductor, a switching element, a diode or a synchronous rectifier switching element, and a capacitor. Switching regulators in a several hundred watts class, in particular, generally uses a system to control the on-off timing of the switching element to operate in a continuous current mode in which the current running in the inductor is continually in the positive polarity. Control of a conventional power factor correction circuit in the continuous current mode operation has been conducted primarily in the average current control system and the peak current control system.

FIG. 4 shows a conventional control circuit in a current control system. In order to stabilize the DC output voltage Vo while controlling a current running in the side of the AC power source 1 to be a sinusoidal waveform in this current control system, a voltage error amplified signal that is a difference between the DC output voltage Vo and a command voltage Vref is generated by a voltage error amplifier 11 and a current command value Vi that is a product of the voltage error amplified signal and an output voltage Vd of the rectifier bridge is generated by a multiplier 12

A current error amplifier 17 generates a current error amplified signal that is a difference between an inductor current signal that is a signal of inductor current IL detected by a current detecting resistor 9 and the current command value Vi. A comparator 18 compares the magnitudes of the current error amplified signal and a carrier signal with a saw tooth or triangular waveform at a constant frequency that is generated and output by a carrier signal generating circuit 19, to generate a control signal Vg for giving to a gate of the switching element 6. Thus, on-off timing of the switching element 6 is controlled. A circuit for setting a feedback constant is to be connected between the output and input sides of each of the voltage error amplifier 11 and the current error amplifier 17 in FIG. 4. The circuit for setting a feedback constant, however, is omitted in FIG. 4.

Next, FIG. 5 shows a conventional control circuit in the peak current control system. A control circuit disclosed in Japanese Unexamined Patent Application Publication No. 2001-028877 is a known example of the peak current control system shown in FIG. 5. The peak current control system shown in FIG. 5 differs from the current control system shown in FIG. 4 in that the peak current control system of FIG. 5 turns the switching element 6 on by the output signal of the pulse generator circuit 20 at a constant frequency and turns the switching element 6 off by detecting, with the comparator 13, an event that the inductor current signal, a magnitude of the inductor current IL detected with the current detection resistor 9, has reached the current command value Vi, while the average current control system shown in FIG. 4 determines on-off timing of the switching element 6 by comparing the magnitude of the current error amplified signal with the magnitude of the output carrier signal of the carrier signal generator circuit 19. The peak current control system shown in FIG. 5 does not need a current error amplifier 17 shown in FIG. 4. The peak current control system in FIG. 5 is depicted omitting, like in FIG. 4, a circuit for setting a feedback constant to be connected to the voltage error amplifier 11.

The control circuit in the peak current control system as shown in FIG. 5 has a problem that an unstable oscillation phenomenon called sub-harmonic oscillation occurs when the output signal of the pulse generator circuit 20 is made at a constant frequency. The Publication of Japanese Unexamined Utility Model Application No. H05-009187 (FIG. 1) copes with this problem by slope compensation corresponding to the input voltage.

Japanese Unexamined Patent Application Publication No. H04-168975 and Japanese Patent Gazette No. H08-032182 (FIG. 1), ("'182") discloses a control method for stable oscillation without the slope compensation by fixing the off time of the switching element. In this method, when the inductor current signal exceeds the current command value, a monostable multivibrator generates a minute off-time with a fixed period of time.

Japanese Unexamined Patent Application Publication No. H08-168248, ("'248") discloses an AC-DC convertor in which the power factor is enhanced and, at the same time, the off-time of switching is made longer when the rectified voltage of the AC input voltage is large and made shorter when the rectified voltage is small. The off-time of switching in this AC-DC converter is varied at every moment in one cycle of the AC power source frequency, according to the rectified voltage measured on a real-time basis.

The conventional current control system as shown in FIG. 4 has problems that it requires two error amplifiers making the control circuit large sized and that it needs complicated adjustment of feedback constants.

The conventional peak current control system as shown in FIG. 5, although it requires one error amplifier maintaining the control circuit relatively small sized, has a problem that stable oscillation in a continuous current mode cannot be performed without varying a slope compensation value according to the voltage of the AC power source, thus requiring a complicated circuit.

In the control system of the '183 reference, the switching frequency varies with a phase θ of the AC power source. In a continuous current mode, the following equations (1) and (2) holds among an effective value Vac of the AC power source voltage, a DC output voltage Vo, an on-period of time T-on of the switching element, an off-period of time T-off of the switching element, because an increment of the inductor current in the on-period T-on equals an decrement of the inductor current in the off-period T-off in the continuous current mode in which the inductor current is continually positive or zero, supposing variation in the input voltage Vin and the output voltage Vo in one switching cycle be negligible. Note that the expression √2 in the following description means a square root of 2.

$$\text{T-on T-in} = \text{T-off (Vo} - \text{Vin)} \qquad (1)$$

$$V_{in} = \sqrt{2}\, V_{ac} \sin\theta \quad (2)$$

A switching frequency fs is given by the following formula (3)

$$fs = 1/T\text{-on} + T\text{-off}) \quad (3)$$

Substituting the equations (1) and (2) into the equation (3), the switching frequency fs is given by the following equation (4).

$$fs = (\sqrt{2}\, V_{ac} \sin\theta / V_o)/T\text{-off} \quad (4)$$

As can be seen from the equation (4), fs is minimum at the phase θ of zero degree and maximum at the phase of 90 degrees. Since the off period T-off is fixed, the maximum switching frequency increases at high AC power source voltage, raising fear of decrease in a conversion efficiency. In order to enhance the conversion efficiency, it is desirable that the maximum frequency does not change irrespective of the AC power source voltage (regardless of a 100 V system or a 200 V system, for example). The control method of the '183 reference, however, cannot accomplish this.

The '248 reference does not mention any means for maintaining the maximum frequency in both AC power source voltages of 100 V and 200 V systems, and even in a changed AC power source voltage due to any trouble. The '248 reference is yet silent about the necessity for detecting the peak value and the average value of the supplied AC power in order to maintain the maximum frequency.

SUMMARY OF THE INVENTION

It is therefore an abject of the present invention to provide a control system of a power factor correction circuit that performs stabilized oscillation operation and suppresses variation of the switching frequency, in particular, the variation due to change of the effective value of the AC power source.

The control system of the present invention is a control system of a power factor correction circuit, the power factor correction circuit including a rectifier bridge for full-wave rectification of an AC power source voltage and a booster circuit having an inductor, a switching element, a diode or a synchronous rectifying switching element, and a capacitor, the booster circuit being connected to an output side of the rectifier bridge, and the control system of a power factor correction circuit controlling an input current from the AC power source to have a sinusoidal waveform by an on-off operation of the switching element or on-off operations of the switching element and the synchronous rectifying switching element, the control system comprising:

a voltage error amplifier outputting a voltage error signal obtained by amplifying a difference between a DC output voltage or a divided voltage thereof from the booster circuit and a reference voltage;

a current command value generating circuit outputting a signal for controlling the input current to have a sinusoidal waveform according to the voltage error signal and an output voltage from the rectifier bridge;

a comparator comparing a magnitude of an inductor current signal obtained by detecting a current running in the inductor with a magnitude of an output signal from the current command value generating circuit;

a timer circuit setting an off-period of the switching element, the off-period being generated in proportion to a peak value or an average value of the output voltage out of the rectifier bridge, or an effective value of the AC power source; and a reset-set type flip-flop circuit that sets an on-timing of the switching element after the off-period set by the timer circuit, and that sets an off-timing of the switching element when the output signal of the comparator detects that the inductor current signal has reached the output signal of the current command value generating circuit.

In an aspect of the control system of a power factor correction circuit of the invention as specified above, the timer circuit comprises a maximum frequency limiting circuit that limits the maximum value of the switching frequency of the switching element.

In an aspect of the control system of a power factor correction circuit of the invention as specified above, the timer circuit comprises a minimum frequency limiting circuit that limits the minimum value of the switching frequency of the switching element.

The invention provides a control system of a power factor correction circuit that performs stabilized oscillation generation with a simple control circuit. The control system of the invention suppresses variation of the switching frequency, in particular, the variation due to change of the peak value, mean value, or the effective value of the AC power source.

The best mode for embodiment of the invention will be described in the following with reference to the accompanying drawings.

DETAILED DESCRIPTION OF THE INVENTION

Figure 1:
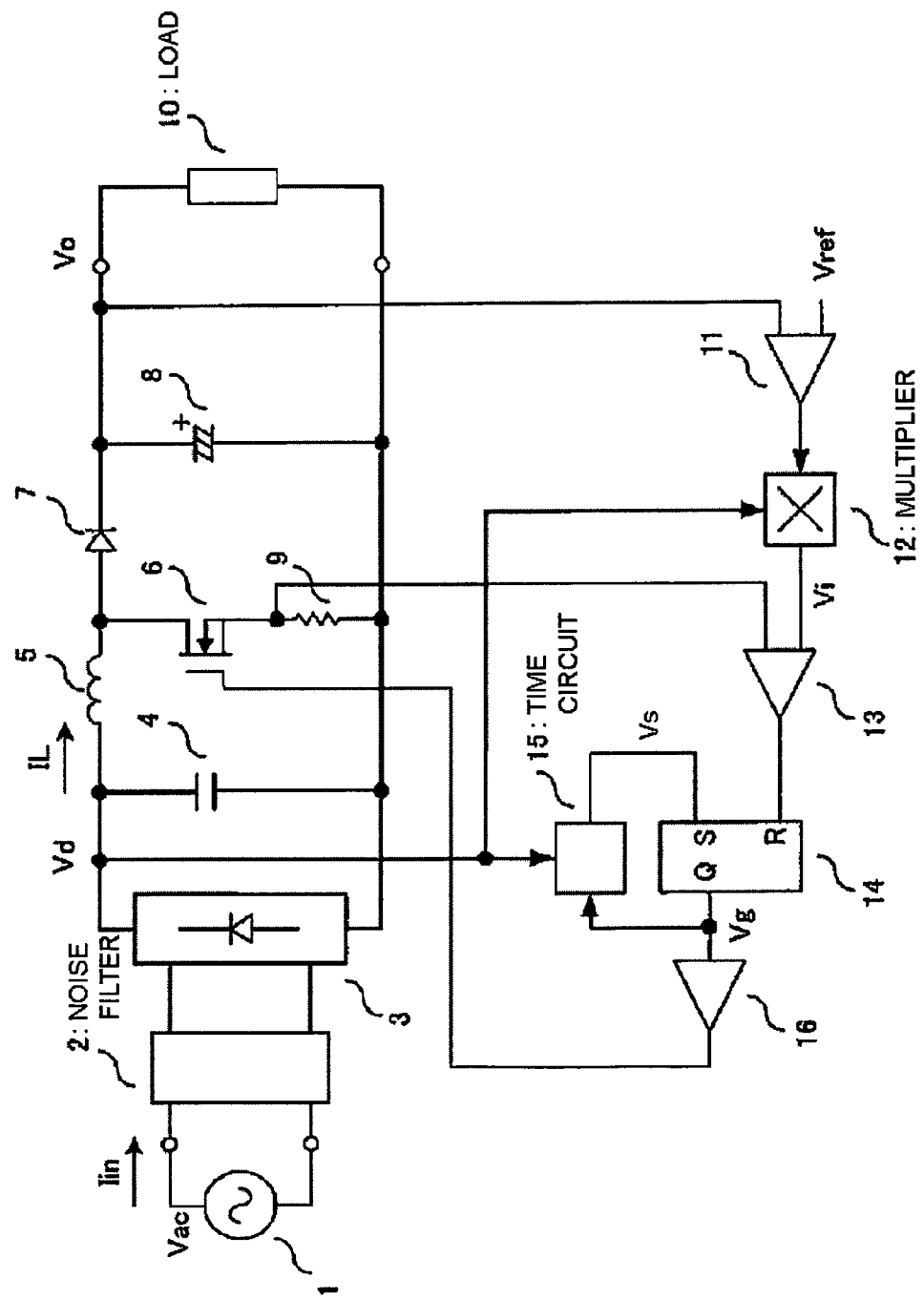
FIG. 1 shows a circuit construction of a control system of a power factor correction circuit of an embodiment according to the invention.

FIG. 1 shows a circuit construction of a control system of a power factor correction circuit of an embodiment according to the invention. Referring to FIG. 1, a main circuit of a switching regulator with power factor correction is composed of a noise filter 2, a rectifier bridge 3 for full-wave rectifying the voltage of an AC power source 1 input through the noise filter 2, and a booster circuit including an inductor 5, a switching element 6, a diode 7, and a smoothing capacitor 8, the booster circuit being connected to the output of the rectifier bridge 3. The capacitor 4 is provided for absorbing a switching noise due to switching of the switching element 6. The current detecting resistor 9 detects the current running in the switching element 6. The diode 7 can be replaced by a synchronous rectification transistor. In that case, the synchronous rectification transistor is turned on and off in complementary operation to the switching element 6.

In order to control the boosted DC output voltage Vo at a constant voltage, the control system comprises a voltage error amplifier 11 that amplifies a difference between the detected voltage of the DC output voltage Vo (the detected voltage can be the Vo itself or a level-shifted voltage, i.e., a divided voltage of the Vo) and a DC output voltage command value Vref. The control system generates a current command value Vi for controlling the input current Iin to have a sinusoidal waveform by generating a product, in a multiplier 12, of the output signal from the voltage error amplifier 11 and a detected voltage of the voltage Vd output from the rectifier bridge 3 (the detected voltage can be the Vd itself or a level-shifted voltage, i.e., a divided voltage of the Vd).

The control system further comprises a comparator 13, a reset-set type flip-flop circuit 14, a timer circuit 15, and a driver 16. The comparator 13 compares a magnitude of an inductor current signal and a magnitude of the output signal Vi from the multiplier 12, the inductor current signal being a voltage developing on the current detection resistor 9 with flow of the inductor current through the inductor 5. The reset-set type flip-flop circuit 14 sets an on-timing of the switching element 6 after an off-period set by a timer circuit 15 for setting an off-period of the switching element 6, and sets an off-timing of the switching element 6 when the output signal of the comparator 13 detects that the inductor current signal has reached the output signal of the current command value generating circuit. A feedback constant setting circuit is omitted in FIG. 1; the circuit is to be connected to the voltage error amplifier 11 and is a series-parallel connected circuit of C and R, for example. The current detecting resistor 9 can be connected at another position as long as it can detect the inductor current during a period from turning on to turning off of the switching element 6. The current detecting resistor 9 can be replaced by a current transformer (not shown in the figure) for detecting the inductor current.

Now, description is made about the off-period T-off set by the timer circuit 15. In a control system of a power factor correction circuit of an embodiment according to the invention, the switching frequency fs represented by the equation (4) can be controlled by varying the off-period T-off in the right hand side of the equation (4) corresponding to the output voltage Vd of the rectifier bridge 3. An example of specific construction of the timer circuit 15 will be described later.

As can be seen from the equation (4), the maximum frequency, which is the frequency at the phase of 90 degrees, can be controlled at a constant value irrespective of the effective value Vac of the AC power source by increasing or decreasing the off-period. T-off in proportion to the effective value Vac. Obviously, the effective value of the output voltage Vd of the rectifier bridge 3 equals the effective value Vac of the AC power source because the rectifier bridge 3 is a full-wave rectification bridge.

The average value of the output voltage Vd of the rectifier bridge 3 is given by the following equation (5).

$$\text{Vav} = \sqrt{2}\, \text{Vac}\, (2/\pi) \quad (5)$$

The peak value Vp of the output voltage Vd of the rectifier bridge 3 is given by the following equation (6)

$$\text{Vp} = \sqrt{2}\, \text{Vac} \quad (6)$$

The average value Vav and the peak value Vp represented by the equations (5) and (6) are both proportional to the effective value Vac. Therefore, it is adequate that the off-period T-off is made proportional to any one of the effective value Vac of the AC power source, the average value of the output voltage Vd of the rectifier bridge 3, and the peak value of the output voltage Vd of the rectifier bridge 3. The proportionality can be appropriately achieved by means of a digital operation using an A/D converter or an analogue operation.

Figure 2:
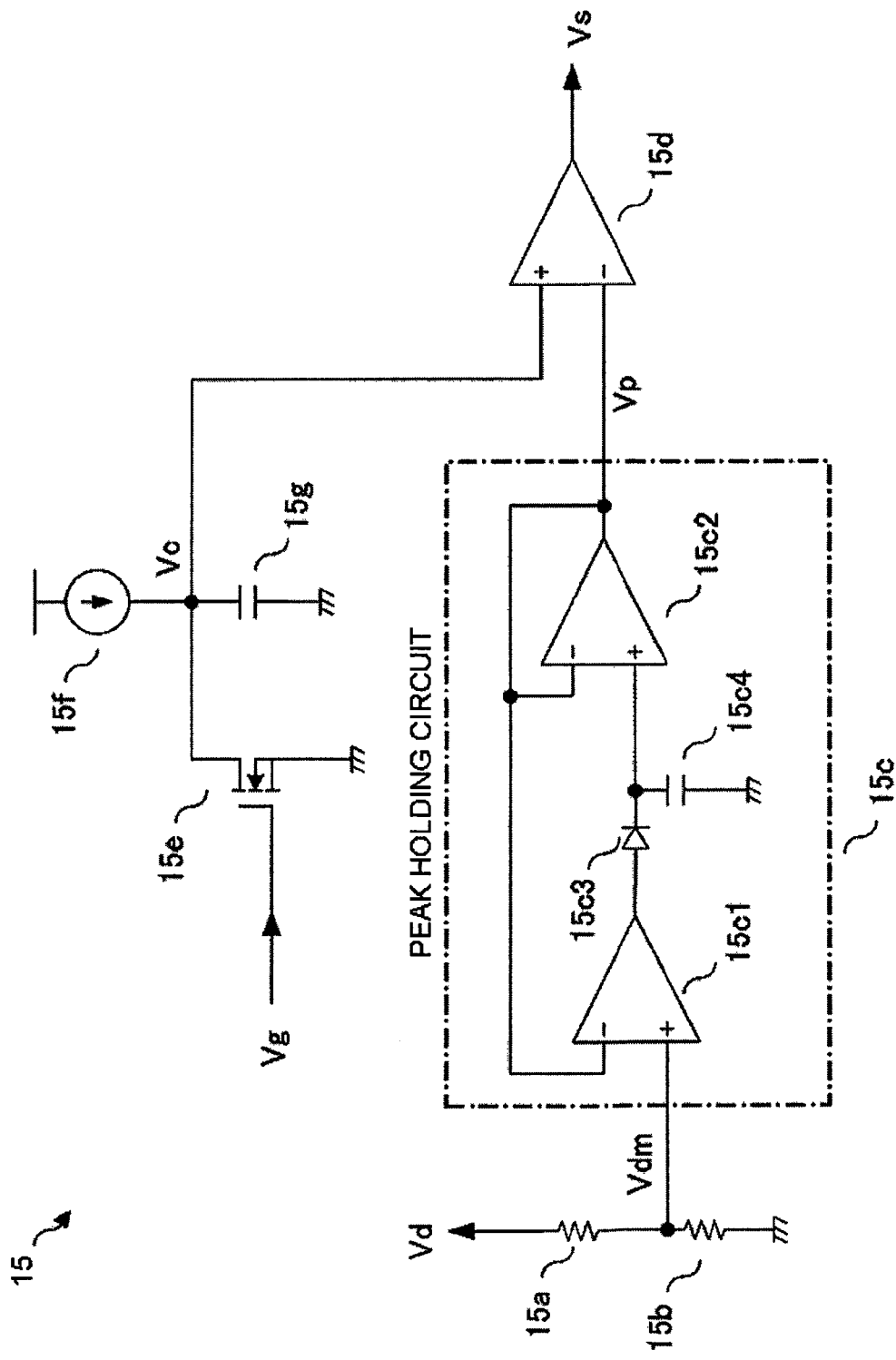
FIG. 2 shows an example of specific construction of the timer circuit in FIG. 1.
Figure 3:
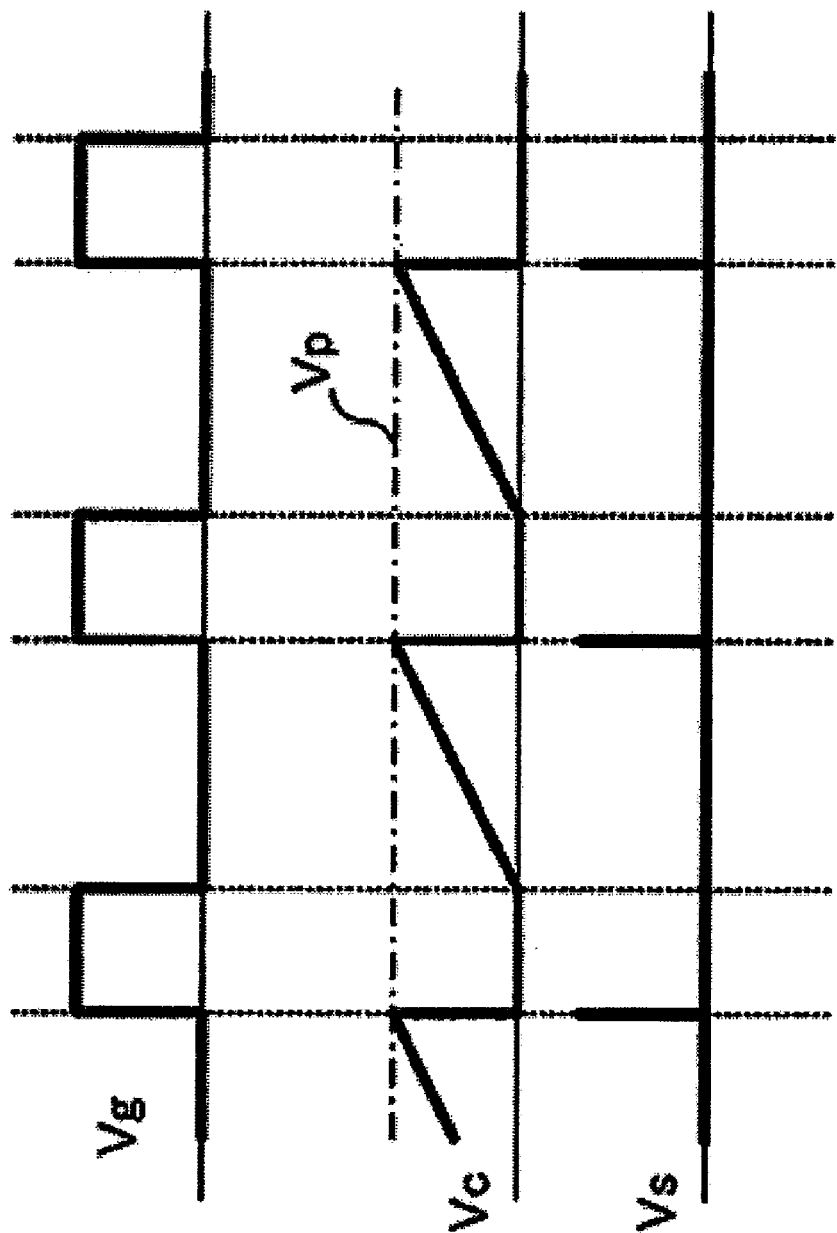
FIG. 3 shows operation waveforms in the timer circuit of FIG. 2.
Figure 4:
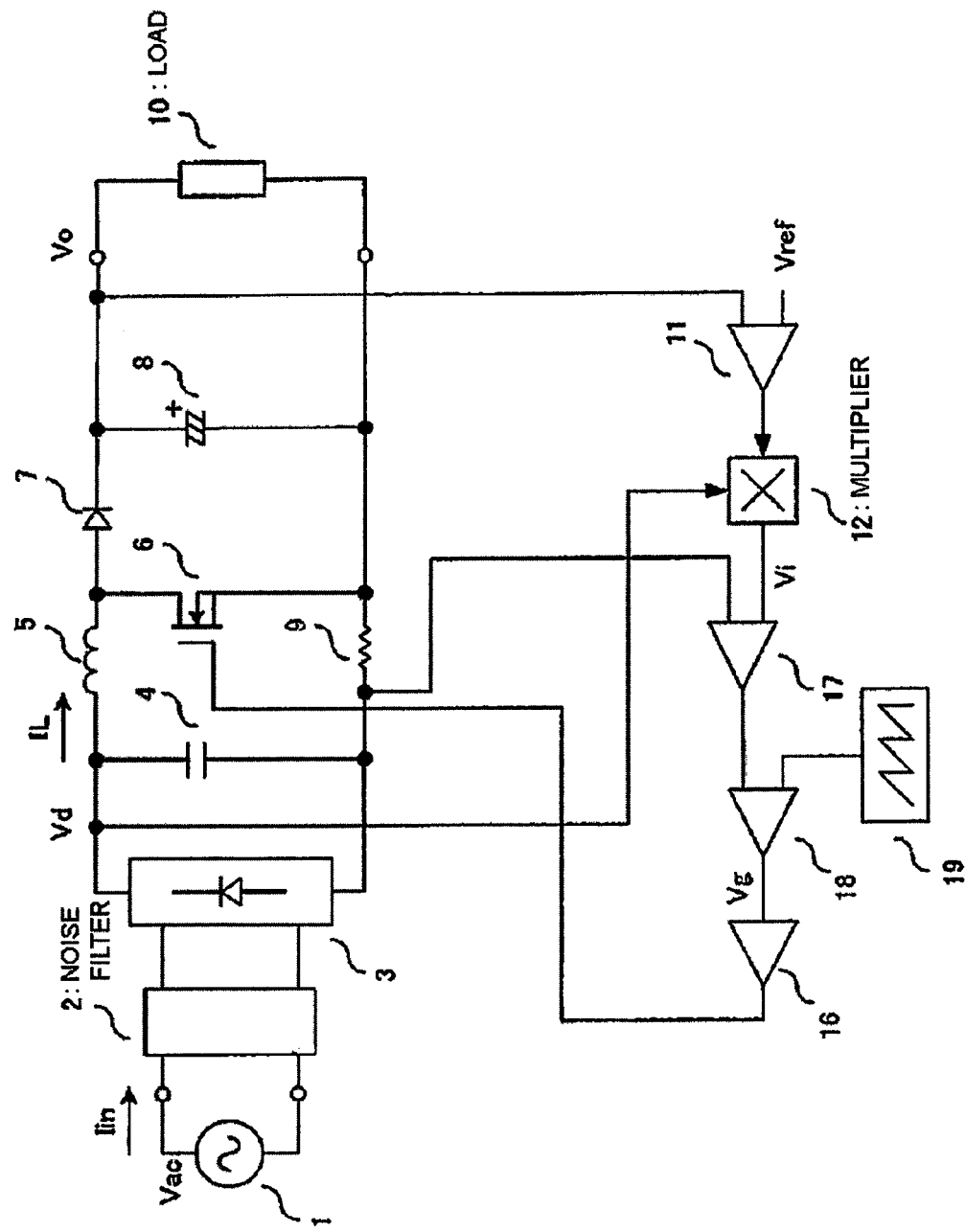
FIG. 4 shows an example of a conventional control circuit of a power factor correction circuit in the average current control system in the continuous current mode.
Figure 5:
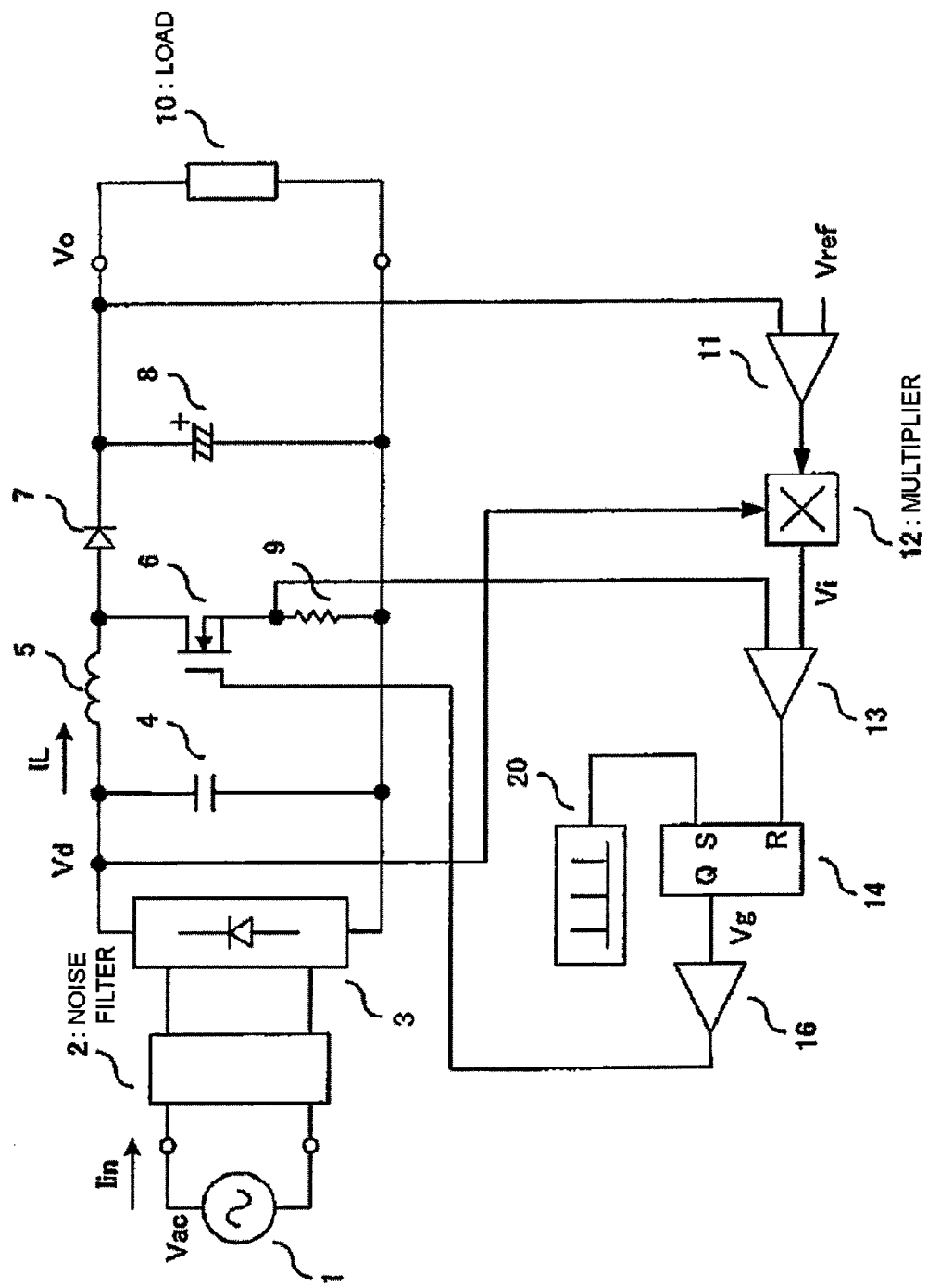
FIG. 5 shows an example of a conventional control circuit of a power factor correction circuit in the peak current control system in the continuous current mode.

FIG. 2 shows an example of specific construction of the timer circuit 15 in FIG. 1. FIG. 3 shows operation waveforms in the timer circuit 15 of FIG. 2.

Referring to FIG. 2, the timer circuit 15 comprises a peak holding circuit 15c, to which a voltage Vdm is given, the Vdm being a portion of the output voltage Vd of the rectifier bridge 3 divided by resistors 15a and 15b. The peak holding circuit 15c hold a peak value and outputs the peak holding value Vp. The peak holding circuit 15c comprises operation amplifiers 15c1, 15c2, a diode 15c3, and a capacitor 15c4. The peak holding value Vp from the peak holding circuit 15c is compared with a charged voltage Vc on the capacitor 15g by a comparator 15d, and when the charged voltage Vc exceeds the peak holding value Vp, a setting pulse Vs is output to the reset-set type flip-flop (RS FF) 14 depicted in FIG. 1. A constant current source 15f supplies the capacitor 15g with a charging current. The electric charges charged on the capacitor 15g are discharged when the switch element 15e is turned on. The switching element 15e is turned on or off synchronously with the control signal Vg that turns the switching element 6 in FIG. 1 on or off.

When the AC power source voltage in FIG. 1 varies, the voltage Vdm, which is a resistor-divided voltage of the output voltage Vd of the rectifier bridge 3, varies, too. The peak holding circuit 15c conducts peak holding at the maximum value of the varied voltages and outputs the peak holding value Vp.

Illustrating this situation with the waveform on the timer circuit as shown in FIG. 3, when the peak holding value Vp has increased by the variation mentioned above from the value at the present moment as indicated in FIG. 3, a timing at which the charging voltage Vc charged on the capacitor 15g exceeds the increased peak holding value Vp shifts to the right, which results in the rightward shift of the timing of the set pulse Vs and the control signal Vg for controlling the switching element 6. Thus, a period of low level is elongated in the control signal Vg for on-off control of the switching element 6, that is, the off-period T-off of the switching element 6 is elongated. Therefore, as seen from the equations (4), the switching frequency fs decreases. On the contrary, when the peak holding value Vp has decreased by the variation mentioned above from the value at the present moment as indicated in FIG. 3, a period of low level is shortened in the control signal Vg for on-off control of the switching element 6, that is, the off-period T-off of the switching element 6 is shortened. Therefore, the switching frequency fs increases.

As described above, the timer circuit 15 shown in FIG. 1 can control the switching frequency fs by setting the off-period of the switching element 6.

In the case the AC voltage variation occurs frequently, two sets of the peak holding circuit 15c as shown in FIG. 2 can be provided. The capacitors 15c4 in the two sets are discharged alternately in every half AC cycle, and the output of the capacitor 15c4 that is not discharged is selected as a peak holding value Vp to output from the peak holding circuit. For the discharging, the capacitor 15c4 is accompanied by a reset transistor (not shown in the figure) connected in parallel with the capacitor.

The timer circuit 15 shown in FIG. 2 and described above performs the control by detecting a peak value. In the case the control is performed based on an average value of a current, the peak holding circuit 15c of the timer circuit shown in FIG. 2 can be appropriately replaced by a low pass filter.

The proportionality to the output voltage Vd of the rectifier bridge 3 can be achieved employing a digital operation using an A/D converter as mentioned previously. In an example of such a technique, the signal Vp or Vdm as indicated in the timer circuit of FIG. 2 is read out by an A/D converter (not shown in the figure) and treated by a microprocessor (not shown in the figure) including a DSP (digital signal processor) (not shown in the figure). In the case the signal Vdm is read out, the microprocessor (not shown in the figure) appropriately performs operation treatment for obtaining the average value or the maximum value and outputs a set pulse Vs from a port of the microprocessor to give it to the reset-set type flip-flop circuit 14 as described previously after passing a period of time (which is the off-period T-off) obtained by the treatment.

Summarizing the descriptions made hereinbefore, the equation (4) is valid in a continuous current mode and, in the discontinuous mode under a light load, and the switching frequency becomes 1/T-off at the maximum. Consequently, the timer circuit 15 can be provided with a circuit for limiting the maximum value of the switching frequency, in order to suppress degradation of the conversion efficiency due to increase in a switching loss. For example, a timer is provided generating a minimum period corresponding to the maximum frequency to output the minimum period T1. A logical AND operation is made between the period T1 and the set pulse Vs to the reset-set type flip-flop circuit 14 as shown in FIG. 2. The obtained AND signal Vs2 is given anew to the reset-set type flip-flop circuit 14 as a set pulse Vs2.

According to the equation (4), the frequency becomes approximately zero around the phase angle of zero degree. Hence, when the switching frequency decreases below the cut-off frequency of the noise filter 2, the noise reduction effect is lost. Accordingly, the timer circuit 15 is appropriately provided with a circuit for limiting the minimum value of the switching frequency in order to avoid extraordinary decrease in the switching frequency. For example, a timer is provided generating a maximum period corresponding to the minimum frequency to output the maximum period T2. A logical OR operation is made between the period T2 and the set pulse Vs2 to the reset-set type flip-flop circuit 14 as described above. The obtained OR signal Vs3 is given anew to the reset-set type flip-flop circuit 14 as a set pulse Vs3. Alternatively, at first, a logical OR operation is performed between the set pulse Vs to the reset-set type flip-flop circuit 14 and the output T2 from the maximum period generating timer as described above, and subsequently a logical AND operation is performed between the logical OR output obtained above and the output T1 from the minimum period generating timer.

What is claimed is:

1. A control system and a power factor correction circuit, comprising:

a rectifier bridge for full-wave rectification of an AC power source voltage;

a booster circuit including an inductor, a switching element, a rectifying unit, and a capacitor, the booster circuit being connected to an output side of the rectifier bridge, the switching element, or the switching element and the rectifying unit, the booster circuit controlling an input current from the AC power source by an on-off operation to have a sinusoidal waveform;

a voltage error amplifier outputting a voltage error signal obtained by amplifying a difference between a DC output voltage or a divided voltage thereof from the booster circuit and a reference voltage;

a current command value generating circuit outputting a signal for controlling an AC input current to have a sinusoidal waveform according to the voltage error signal and an output voltage from the rectifier bridge;

a comparator comparing a magnitude of an inductor current signal obtained by detecting a current running in the inductor with a magnitude of an output signal from the current command value generating circuit;

a timer circuit setting an off-period of the switching element, the off-period being generated in proportion to a peak value or an average value of the output voltage out of the rectifier bridge, or an effective value of the AC power source, the timer circuit comprising a peak holding circuit that conducts peak holding at a maximum of at least a portion of an output voltage of the rectifier bridge and outputs a corresponding peak holding value; and a reset-set type flip-flop circuit that sets an on-timing of the switching element after the off-period set by the timer circuit, and that sets an off-timing of the switching element when the output signal of the comparator detects that the inductor current signal has reached the output signal of the current command value generating circuit.

2. The control system and power factor correction circuit according to claim 1, wherein the timer circuit comprises a maximum frequency limiting circuit that limits the maximum value of the switching frequency of the switching element.

3. The control system and power factor correction circuit according to claim 2, wherein the timer circuit comprises a minimum frequency limiting circuit that limits the minimum value of the switching frequency of the switching element.

4. The control system and power factor correction circuit according to claim 1, the timer circuit further comprising a capacitor charged with a voltage, and a comparator that compares the peak holding value with the capacitor voltage, wherein the timer circuit outputs, to the reset-set type flip-flop circuit, a setting pulse corresponding to the off-period of the switching element based on an output of the comparator that compares the peak holding value with the capacitor voltage.

5. The control system and power factor correction circuit according to claim 1, wherein the power factor correction circuit comprises the rectifier bridge and the booster circuit.

6. The control system and power factor correction circuit according to claim 1, wherein the control system comprises the voltage error amplifier, the current command value generating circuit, the comparator, the timer circuit, and the reset-set type flip-flop circuit.

7. The control system and power factor correction circuit according to claim 1, wherein the rectifying unit is a diode.

8. The control system and power factor correction circuit according to claim 1, wherein the rectifying unit is a synchronous rectifying switching element.

* * * * *